UNITED STATES PATENT OFFICE.

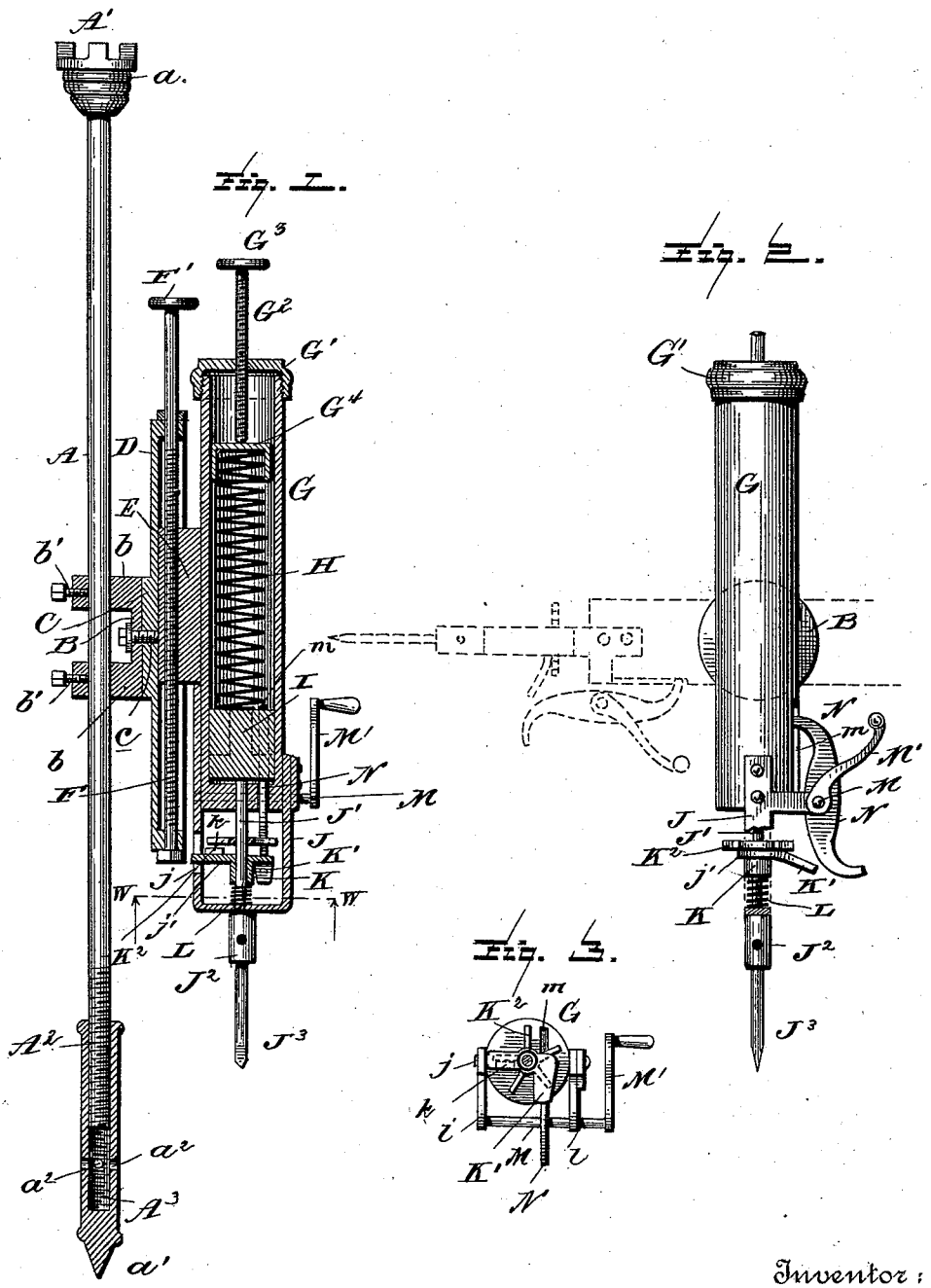

GABRIEL A. MENENDEZ, OF MARINETTE, WISCONSIN, ASSIGNOR OF TWO-THIRDS TO WILLIAM A. CLARK AND EDWARD B. LEWIS, BOTH OF SAME PLACE.

DRILL.

SPECIFICATION forming part of Letters Patent No. 423,620, dated March 18, 1890.

Application filed January 23, 1890. Serial No. 337,871. (No model.)

*To all whom it may concern:*

Be it known that I, GABRIEL A. MENENDEZ, a citizen of the United States, residing at Marinette, in the county of Marinette, State of Wisconsin, have invented certain new and useful Improvements in Drills, of which the following is a specification, reference being had therein to the accompanying drawings.

This invention relates to certain new and useful improvements in drills; and it has for its object among others to provide for the setting of the drill at any desired angle without affecting the blow of the drill. I provide for the automatic turning of the drill as the blow is struck, have a spring-actuated weight to impart the blow, and in general have produced a drill which has proved to be most efficient in all its parts, and which accomplishes a greater amount of work in a given time. I can drill a hole up as well as down or at any angle.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a longitudinal section through my improved drill and its attachments. Fig. 2 is a side elevation of a portion of the same. Fig. 3 is a cross-section on the line $w\ w$ of Fig. 1, looking in the direction of the arrows.

Like letters of reference indicate like parts throughout the several views.

Referring now to the details of the drawings by letter, A designates a rod or shaft provided at one end with a head $a$, which is preferably provided with holding jaws or projections A', to enable it to better hold against the rock or other surface against which it is placed. The other end of this rod or shaft is screw-threaded, as shown at $A^2$, and adapted to engage the internal threads of the sleeve $A^3$, one end of which is pointed or sharpened, as shown at $a'$, and is provided with suitable provisions for the turning of the sleeve when desired. In the drawings I have shown this sleeve as being provided with a plurality of holes $a^2$ for the reception of a suitable tool by which it may be turned; but other means for turning the sleeve might be provided without affecting the other features of the invention. This rod, with its sleeve, is adapted to support the operating parts, and is adapted to be placed across the shaft or other place in proper position to hold the parts so that the hole may be drilled in the desired place. It is placed in position and then the parts lengthened to firmly brace the same and prevent its being moved in the operation of the drill by turning up the sleeve, as will be readily understood.

B is a disk formed with lugs $b$, which are apertured for the passage of the rod A, upon which they are sleeved, and to which they are held in their adjusted position by means of the set-screws $b'$, which are tapped through the lugs and bear against the rod, as shown in Fig. 1. This disk may be readily adjusted along the rod to bring the drill, which is carried by said disk, into the desired position. This disk B bears against a like disk C, the two forming a sort of turn-table, the two being pivotally secured together by means of a pivot-pin or screw $c$, as shown in Fig. 1, the said pin or screw having a squared head by which it may be tightened by a suitable wrench or other device to hold the parts from turning after they have been adjusted to the desired position. The disk C is rigid with a tube D, open upon one side and within which the block E travels, and through the opening in the side of which the said block projects, as shown in Fig. 1. This block has a screw-threaded opening therethrough longitudinally and which is engaged by the screw-rod F, having bearings in the ends of the tube, so as to turn readily, and is provided with a thumb-nut or other suitable means F', by which it may be turned. The turning of this rod moves the block lengthwise in the tube to feed the drill forward at each blow, or when desired. This block is rigid with the cylinder G, which I term the "drill-holder," and consequently as the block is moved the drill-holder must necessarily move too. The upper end of this cylinder is provided with a detachable cap G', through which is tapped the adjusting-screw G², provided with a suitable thumb-nut or other suitable means G³, by which it may be turned. The object of this screw is to regulate the pressure of the spring H on the hammer or weight which actuates the drill. This spring is a stout coiled spring arranged longitudinally within the cylinder and held at one end by a cup-shaped holder G⁴, against which the adjusting-screw G² bears, as shown in Fig. 1. The opposite end of this spring bears against the hammer or weight I, which is arranged to play loosely within the cylinder. There may be a wooden sleeve around the hammer, as indicated by dotted lines in Fig. 1, if preferred.

J is a bracket, or it may be a tube, depending from the end of the cylinder, as shown in Fig. 1, and J' is a rod working loosely through an opening in the lower head of the cylinder and arranged to be acted upon by the hammer. The outer end of this rod works loosely through an opening in the cross-bar or end of the bracket or tube J, and is provided outside the said cross-bar or end with a shouldered holder or chuck J², which is designed to carry the drill-point J³. One side of this bracket is provided with an elongated slot $j$, in which works the extension or lateral portion $j'$ of the sleeve K, which is free to move upon the rod J' lengthwise thereof, but prevented from turning thereon.

L is a coiled spring confined around the rod J' between the cross-bar or end of the bracket J and the end of the collar or boss on the sleeve K. The sleeve has a downwardly-turned arm K' and a stop $k$ upon its upper face.

Upon the rod J' is a star-wheel K², rigid with and designed to revolve with the said rod. Normally the spring L keeps the sleeve up in contact with one of the arms of the star-wheel, which arm is in engagement with the stop of the sleeve, and the star-wheel is thus prevented from turning.

Journaled in suitable supports, as the arms $l$, attached to the cylinder G, is the transverse shaft M, provided with a suitable crank and handle M', by which it is revolved. This shaft carries two diametrically oppositely disposed striker-arms N, the outer ends of which are curved, as shown in Fig. 2, and these arms are so arranged in relation to the arm K' that as the shaft is turned one or the other of these striker-arms will contact with the said arm and depress it and its sleeve.

The operation will be readily understood from the above description when taken in connection with the drawings. When the drill is at work, the star-wheel will be prevented from turning till the striker-arm engages the arm of the sleeve and depresses it, when the said arm in its further movement will strike one of the arms of the star-wheel, which at this time will be free of the stop on the sleeve owing to the said sleeve being moved away from the star-wheel, and the star-wheel will be moved one tooth, thus turning the drill. As soon as the striker-arm leaves the arm of the sleeve the spring L serves to force the sleeve upward again, when its stop holds the star-wheel from turning. The stop on the sleeve and the arms of the star-wheel are so arranged in relation to each other that the striker-arms will contact with one of the arms before it leaves the arm of the sleeve; otherwise the spring L would force the sleeve upward and prevent the star-wheel and drill from turning. Each time the shaft M is turned one of the striker-arms comes in contact with the under side of the hammer or weight through an opening $m$ provided therefor in the side of the cylinder and lifts the hammer. As soon as the curved end of the arm leaves the hammer and passes out of the slot the spring within the cylinder forces the hammer forward into contact with the rod J' and imparts a blow to the drill. The drill is forced forward as the drilling proceeds by the screw-rod F and block E.

What I claim as new is—

1. The combination, with the drill and its rod, the hammer, and means for operating said hammer, of the wheel fast on the rod, the vertically-movable sleeve around the rod, and a striker for actuating the sleeve and wheel, substantially as specified.

2. The combination, with the drill, its rod, and the hammer, of the means for actuating the hammer, the wheel fast on the rod, the spring-actuated vertically-movable sleeve on the rod, and the striker-arms constructed to actuate the hammer, the sleeve, and the wheel, as set forth.

3. The combination, with the drill, its rod, and the hammer arranged to actuate said rod, of the sleeve on the rod and free to move lengthwise thereof, the wheel fast on the rod and prevented from turning by a stop on the sleeve, and a spring acting on the sleeve, as set forth.

4. The combination, with the drill, its rod, and the hammer, of the sleeve free to move lengthwise of the rod and provided with an arm and a stop, the wheel fast on the rod and arranged to engage said stop, and the striker-arms constructed to actuate the hammer and to engage the sleeve-arm and the wheel, as set forth.

5. The combination, with the drill, its rod, and the hammer, of the wheel fast on the rod, the sleeve free to move lengthwise of the rod, and the striker-arm arranged to move the sleeve and engage one of the arms of the wheel before leaving said arm, substantially as and for the purpose specified.

6. The combination, with the drill-rod, the hammer, and the wheel fast on the rod, of the sleeve free to move lengthwise of the rod and provided with a downwardly-inclined arm and the transverse shaft and the oppositely-disposed arms thereon, having curved ends and arranged to serve as set forth.

7. The combination, with the cylinder and the spring-actuated hammer therein, of the bracket on the cylinder, the rod passed through a hole in the end of the bracket, the sleeve on the rod, the spring around the rod between the sleeve and the end of the bracket, the wheel fast on the rod, and the striker-arms, all arranged and operating substantially as shown and described.

In testimony whereof I affix my signature in presence of two witnesses.

GABRIEL A. MENENDEZ.

Witnesses:
E. C. EASTMAN,
B. E. O'HARA.